(12) United States Patent
Yoshimura

(10) Patent No.: US 10,011,700 B2
(45) Date of Patent: Jul. 3, 2018

(54) POLYAMIDE RESIN COMPOSITION AND METHOD FOR ENHANCING THERMAL AGING RESISTANCE OF POLYAMIDE RESIN

(71) Applicant: TOYOBO CO., LTD., Osaka (JP)

(72) Inventor: Nobuhiro Yoshimura, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 15/312,224

(22) PCT Filed: May 20, 2015

(86) PCT No.: PCT/JP2015/064459
§ 371 (c)(1),
(2) Date: Nov. 18, 2016

(87) PCT Pub. No.: WO2015/178417
PCT Pub. Date: Nov. 26, 2015

(65) Prior Publication Data
US 2017/0081498 A1    Mar. 23, 2017

(30) Foreign Application Priority Data

May 21, 2014  (JP) .................. 2014-105336
Sep. 1, 2014  (JP) .................. 2014-176985

(51) Int. Cl.
| | |
|---|---|
| C08K 3/28 | (2006.01) |
| C08K 3/16 | (2006.01) |
| C08L 77/06 | (2006.01) |
| C08J 3/20 | (2006.01) |
| C08G 69/36 | (2006.01) |

(52) U.S. Cl.
CPC ............ C08K 3/28 (2013.01); C08J 3/203 (2013.01); C08K 3/16 (2013.01); C08G 69/36 (2013.01); *C08J 2377/06* (2013.01); *C08L 77/06* (2013.01)

(58) Field of Classification Search
CPC ............ C08L 77/00; C08K 3/16; C08K 3/28
See application file for complete search history.

(56) References Cited

U.S. PATENT DOCUMENTS

| | | | | | |
|---|---|---|---|---|---|
| 3,491,042 | A | * | 1/1970 | Hermann | C08K 3/28 524/147 |
| 3,492,266 | A | * | 1/1970 | Hermann | C08K 3/28 524/413 |
| 3,519,595 | A | * | 7/1970 | Rudolph | C08K 3/16 524/396 |
| 2011/0039993 | A1 | * | 2/2011 | Peduto | C08L 77/06 524/115 |
| 2011/0200784 | A1 | * | 8/2011 | Agarwal | D01F 1/07 428/97 |

FOREIGN PATENT DOCUMENTS

| | | |
|---|---|---|
| JP | 62-290759 | 12/1987 |
| JP | 7-47690 | 5/1995 |
| JP | 2003-509578 | 3/2003 |
| JP | 2006-528260 | 12/2006 |
| JP | 2008-527127 | 7/2008 |
| JP | 2008-527129 | 7/2008 |
| JP | 2010-270318 | 12/2010 |
| JP | 2012-500305 | 1/2012 |
| JP | 2013-10087 | 1/2013 |
| JP | 2013-213091 | 10/2013 |
| WO | 01/21393 | 3/2001 |
| WO | 2005/007727 | 1/2005 |
| WO | 2006/074912 | 7/2006 |
| WO | 2006/074934 | 7/2006 |
| WO | 2010/019746 | 2/2010 |

OTHER PUBLICATIONS

International Search Report dated Aug. 11, 2015 in International Application No. PCT/JP2015/064459.

\* cited by examiner

*Primary Examiner* — Brieann R Johnston
(74) *Attorney, Agent, or Firm* — Wenderoth, Lind & Ponack, L.L.P.

(57) ABSTRACT

The present invention is a polyamide resin composition having excellent thermal aging resistance and excellent mechanical characteristics, and containing 0.5 to 20 part(s) by mass of a metal cyanide salt having the general composition formula $(A_x[M(CN)_y])$ to 100 parts by mass of a polyamide resin. In the general composition formula, M is at least one member of transition metal elements in groups 5 to 10 and periods 4 to 6 of a periodic table; A is at least one member of alkali metal and alkaline earth metal; y is an integer of from 3 to 6; and x is a number calculated by $(y-m)/a$, wherein m is a valence of M and a is a valence of A.

5 Claims, No Drawings

POLYAMIDE RESIN COMPOSITION AND METHOD FOR ENHANCING THERMAL AGING RESISTANCE OF POLYAMIDE RESIN

TECHNICAL FIELD OF THE INVENTION

The present invention relates to a polyamide resin composition having excellent thermal aging resistance and also to a method for enhancing thermal aging resistance of a polyamide resin.

BACKGROUND ART

Since a polyamide resin has excellent characteristics such as mechanical characteristics as well as resistance to chemicals and moldability, it has been widely utilized in various parts such as automobile parts, electric and electronic parts and industrial machine parts. Although a polyamide resin is relatively excellent in thermal aging resistance, deterioration by the action of heat and light is unavoidable. As to a method for enhancing thermal aging resistance of a polyamide resin, methods wherein copper halide, potassium halide, oxazole compound or the like is added as a thermostabilizer have been known from old time already (for example, Patent Document 1).

As a result of the art as such, a polyamide resin is used in the parts for the use being exposed to high-temperature environments of about 140° C. in the fields of automobile parts and electric and electronic parts.

However, with regard to engine room of automobiles for example, environmental temperature in the engine room has become high as a result of increase in engine output, tendency of arranging the parts with high density, etc. in recent years and there has been a demand for high level of thermal aging resistance which has not been aimed until now.

In order to fulfill this demand, there have been proposed a method wherein polyamide is compounded with finely granulated element iron (Patent Document 2), a method wherein polyamide is compounded with finely granulated and dispersed metal powder (Patent Document 3), a method wherein a mixture of two kinds of polyamides having different melting points from each other is compounded with a copper compound and iron oxide (Patent Document 4), a method wherein polyamide is compounded with a thermostabilizer such as copper iodide or potassium iodide and a composite oxide such as tri-iron tetraoxide (containing iron (II) oxide) (Patent Document 5), etc. It has been said that the products obtained by these methods are excellent in thermal aging resistance even under the environment of as high as about 200° C.

However, in the methods of Patent Documents 2 and 3, there is a danger of ignition during preparation of a composition whereby the preparation is not easy. In the method of Patent Document 4, there is a disadvantage that the effect is achieved only by a very limited composition. In the method of Patent Document 5, there may be the case wherein stability and reproducibility of the thermal aging resistance and the mechanical strength are inferior. As such, it is the current status that any of them is to be still improved.

PRIOR ART DOCUMENTS

Patent Documents

Patent Document 1: Japanese Patent Pregrant Publication (JP-B) No. 47690/95

Patent Document 2: Japanese Patent Application Laid-Open (JP-A) No. 2006-528260

Patent Document 3: Japanese Patent Application Laid-Open (JP-A) No. 2008-527127

Patent Document 4: Japanese Patent Application Laid-Open (JP-A) No. 2008-527129

Patent Document 5: Japanese Patent Application Laid-Open (JP-A) No. 2010-270318

DISCLOSURE OF THE INVENTION

Problem that the Invention is to Solve

The problem to be solved by the present invention is to provide a method for enhancing thermal aging resistance wherein the thermal ageing resistance in a level which is resistant to the high-temperature environment of about 200° C. can be easily and stably imparted to a polyamide resin and is also to provide a polyamide resin composition having excellent thermal aging resistance and excellent mechanical characteristics prepared by the above method.

Means for Solving the Problem

In order to solve the above problem, the inventors have repeatedly conducted extensive studies for a compound of transition metal such as iron and, as a result, they have achieved the present invention.

Thus, the present invention is as follows.

[1] A polyamide resin composition, characterized in that, to 100 parts by mass of a polyamide resin, 0.5 to 20 part(s) by mass of a metal cyanide salt having the following general composition formula (1) is compounded:

$$A_x[M(CN)_y] \qquad \text{General composition formula (1)}$$

(In the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A.)

[2] The polyamide resin composition according to [1], wherein M in the general composition formula (1) is iron.

[3] The polyamide resin composition according to [1], wherein the metal cyanide salt in the general composition formula (1) is one or more member(s) selected from the group consisting of alkali metal hexacyanoferrate (II) and alkali metal hexacyanoferrate (III).

[4] The polyamide resin composition according to any of [1] to [3], wherein, to 100 parts by mass of the polyamide resin, a copper compound is compounded in an amount of 0.0001 to 1 part by mass as copper.

[5] A method for enhancing thermal aging resistance of a polyamide resin, characterized in that, to 100 parts by mass of a polyamide resin, 0.5 to 20 part(s) by mass of a metal cyanide salt having the following general composition formula (1) is compounded:

$$A_x[M(CN)_y] \qquad \text{General composition formula (1)}$$

(In the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A.)

Advantages of the Invention

In accordance with the present invention, thermal aging resistance of a polyamide resin under a high-temperature environment of about 200° C. can be stably enhanced for a long period by such a simple method that a specific compound is compounded therewith. Further, the polyamide resin composition prepared thereby has excellent thermal aging resistance and mechanical characteristics.

BEST MODE FOR CARRYING OUT THE INVENTION

Hereinafter, the present invention will be specifically illustrated.

The polyamide resin in the present invention is not particularly limited. Examples thereof include an open-ring polymer of cyclic lactam, a polycondensate of amino carboxylic acid, a polycondensate of dibasic acid with diamine and copolymers thereof. Specific examples thereof include an aliphatic polyamide such as polycaproamide (polyamide 6), polyhexamethyleneadipamide (polyamide 66), polytetramethyleneadipamide (polyamide 46), polyhexamethylenesebacamide (polyamide 610), polyhexamethylenedodecamide (polyamide 612), poly-lauryllactam (polyamide 12) and poly-11-aminoundecanoic acid (polyamide 11); an aliphatic-aromatic polyamide such as poly(m-xyleneadipamide) (hereinafter, abbreviated as MXD•6), poly(hexamethyleneterephthalamide) (hereinafter, abbreviated as 6T), poly(hexamethyleneisophthalamide) (hereinafter, abbreviated as 6I), poly(nonamethyleneterephthalamide) (hereinafter, abbreviated as 9T) and poly(tetramethyleneisophthalamide) (hereinafter, abbreviated as 4I); and copolymers and mixtures thereof. As to the polyamide which is particularly advantageous in the present invention, there may be exemplified polyamide 6, polyamide 66, polyamide 6/66 copolymer, polyamide 66/6T copolymer, polyamide 6T/12 copolymer, polyamide 6T/11 copolymer, polyamide 6T/6I copolymer, polyamide 6T/6I/12 copolymer, polyamide 6I/610 copolymer and polyamide 6I/6I/6 copolymer.

Although there is no particular limitation for the molecular weight of the polyamide resin as such, it is preferred to use a polyamide resin wherein the relative viscosity measured at 25° C. with 1% by mass concentration in 98% (98% by mass) sulfuric acid is 1.7 to 4.5. The relative viscosity of the polyamide resin is more preferred to be 2.0 to 4.0, and further more preferred to be 2.0 to 3.5.

The metal cyanide salt in the present invention is shown by the following general composition formula (1):

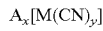  General composition formula (1)

(In the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A.)

The metal cyanide salt may also be a hydrate.

M in the above general composition formula (1) is at least one member of transition metal elements in groups 5 to 10 and periods 4 to 6 of a periodic table. As to the preferred metal element, there may be exemplified Fe, Co, Cr, Mn, Ir, Rh, Ru, V and Ni. When the valence of metal element is also taken into consideration, Fe (II), Fe(III), Co(III), Cr(III), Mn(II), Mn(III), Ir(III), Rh(III), Ru(II), V(IV), V(V), Co(II), Ni(II) and Cr(II) are preferred. Co(II), Co(III), Fe(II), Fe(III), Cr(III), Ir(III) and Ni(II) are more preferred. Fe(II) and Fe(III) are particularly preferred. Two or more kinds of metal may be present in the metal cyanide salt (e.g., potassium hexacyanocobaltate(II) ferrate (II)). A is at least one member of alkali metal (such as Li, Na and K) and alkaline earth metal (such as Ca and Ba). y is an integer of from 3 to 6. x is selected in such a manner that the metal cyanide salt becomes electrically neutral as a whole. Thus, x is a number calculated by (y−m)/a (wherein m is a valence of M and a is a valence of A). Particularly, y corresponds to a coordination number of M and is preferred to be 4 to 6, and particularly preferred to be 6.

Although examples of the metal cyanide salt which can be used in the present invention are not particularly limited, preferred ones are potassium hexacyanoferrate (II), potassium hexacyanoferrate (III), sodium hexacyanoferrate (II), sodium hexacyanoferrate (III), potassium hexacyanocobaltate (III), sodium hexacyanocobaltate (III), potassium hexacyanoruthenate (II), calcium hexacyanocobaltate (III), potassium tetracyanonickelate (II), potassium hexacyanochromate (III), potassium hexacyanoiridiumate (III), calcium hexacyanoferrate (II), potassium hexacyanocobaltate (II) and lithium hexacyanocobaltate (III). More preferred ones are potassium hexacyanoferrate (II), potassium hexacyanoferrate (III), sodium hexacyanoferrate (II) and sodium hexacyanoferrate (III) in view of handling and safety.

In the present invention, compounding amount of the above metal cyanide salt to 100 parts by mass of the polyamide resin is 0.5 to 20 part(s) by mass. The compounding amount of the metal cyanide salt is preferably 0.5 to 15 part(s) by mass, more preferably 1 to 13 part(s) by mass, furthermore preferably 1 to 12 part(s) by mass, and particularly preferably 1.5 to 12 parts by mass.

When the compounding amount of the metal cyanide salt is less than 0.5 part by mass, there is almost no effect of expressing thermal aging resistance while, even when the compounding amount of the metal cyanide salt is more than 20 parts by mass, there is no further increase in thermal aging resistance. When the compounding amount of the metal cyanide salt is 20 parts by mass or less, bad affection to mechanical characteristics is little unlike metal particles and metal oxide particles. Even particularly in the case of a composition reinforced with a glass fiber, breakage of the glass fiber can be suppressed whereby mechanical characteristics are rarely lowered.

When the metal cyanide salt is a hydrate, its compounding amount shall be in terms of the mass as a compound including the water of hydration.

Although the reason why thermal aging resistance is expressed by the metal cyanide salt in the present invention is not clear, it is likely that the metal cyanide salt interacts with the polyamide resin near the surface layer of the composition and, as a result, a barrier effect for suppressing the permeation of oxygen is achieved thereby.

Further, as compared with an iron compound such as iron oxide which is a conventionally used thermal aging resisting compound, the metal cyanide salt used in the present invention can suppress lowering of mechanical characteristics of the polyamide resin composition after the compounding. Iron oxide is a metal oxide in minerals and its Mohs' hardness is as very hard as 6. Accordingly, in a polyamide composition containing glass fiber, iron oxide breaks the glass fiber whereby the mechanical characteristics lower. On the other hand, since metal cyanide salt is not a mineral, it does not break glass fiber in a polyamide resin composition containing the glass fiber whereby mechanical characteristics are excellent.

In the present invention, in addition to the metal cyanide salt, known thermostabilizer may also be used together therewith.

As to the copper compound which can be used in the present invention, there may be exemplified copper acetate, copper iodide, copper bromide, copper chloride, copper fluoride, copper laurate and copper stearate. Each of those copper compounds may be used solely or jointly. Copper acetate, copper iodide, copper bromide and copper chloride are preferred and cupric bromide is particularly preferably used. Adding amount of the copper compound to 100 parts by mass of the polyamide resin is 0.0001 to 1 part by mass in terms of copper in the copper compound. When adding amount of the copper compound is less than 0.0001 part by mass, an effect of prevention of discoloration in severer environment under high-temperature atmosphere and ultraviolet irradiation is insufficient while, when adding amount of the copper compound is more than 1 part by mass, the effect of prevention of discoloration under the above severe environment reaches a saturation and, moreover, there is a risk of causing such a problem that metal die and screw, cylinder, etc. of extruders and molding machines are corroded. More preferable adding amount is 0.0005 to 1 part by mass, and further more preferable adding amount is 0.005 to 0.2 part by mass.

Further, when the copper compound is added, it is preferred that an alkali metal halide compound such as potassium iodide or potassium bromide is used together therewith. As a result of such a joint use, separation of copper can be prevented. As to a method for adding the copper compound, addition may be done in any stage of the preparation of the polyamide resin and there is no limitation for the adding method. Thus, for example, any of the following method is acceptable: a method wherein the copper compound is added to an aqueous solution of a material salt of polyamide; a method wherein the copper compound is added by injection into melted polyamide during the course of melt polymerization; and a method wherein, after finishing the polymerization, the polyamide pellets are granulated and blended with powder or master batch of the copper compound, and the resulting mixture is melt-kneaded using an extruder or a molding machine.

It is also possible in the present invention to compound an auxiliary stabilizer such as antioxidant (e.g., antioxidant of a hindered phenol type, antioxidant of a phosphorus type, antioxidant of a sulfur type and antioxidant of an amine type) and a light stabilizer.

As to the antioxidant of a hindered phenol type, known compounds may be used. Each of them may be used either solely or in combination. Among the antioxidants of a hindered phenol type as such, phenol of two or more functions is preferred and a semi-hindered type such as triethylene glycol bis[3-(3-tert-butyl-5-methyl-4-hydroxyphenyl)propionate] (Irganox 245) is preferred due to its little discoloration.

When the antioxidant of a hindered phenol type is compounded, its compounding amount to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, the effect may reach a saturation or blooming onto the surface of a molded product may happen.

The antioxidant of a phosphorus type is at least one member selected from antioxidants of inorganic and organic phosphorus types. Examples of the antioxidant of an inorganic phosphorus type are hypophosphites such as sodium hypophosphite and a phosphite.

As to the antioxidant of an organic phosphorus type, commercially available antioxidant of an organic phosphorus type in a phosphite type may be used. It is preferred to use a compound containing organic phosphorus which does not generate phosphoric acid by thermal decomposition. As to the compound containing organic phosphorus as such, known compounds may be used.

When the antioxidant of a phosphorus type is compounded, its compounding amount to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, flash may be generated in a molded product.

When the antioxidants of inorganic and organic phosphorus types are used together in the present invention, compounding amount of an antioxidant can be made small whereby that is preferred.

As to the antioxidant of an amine type which may be used in the present invention, known compounds may be used. In addition, a secondary arylamine may also be listed as the antioxidant of an amine type. The secondary arylamine stands for an amine compound containing two carbon radicals which are chemically bonded to nitrogen atom, wherein at least one of the carbon radicals or preferably both is/are aromatic group.

When the antioxidant of an amine type is compounded, its compounding amount to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, the effect may reach a saturation or blooming onto the surface of a molded product may happen.

As to the antioxidant of a sulfur type which may be used in the present invention, known compounds may be used.

When the antioxidant of a sulfur type is compounded, its compounding amount to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, the effect may reach a saturation or blooming onto the surface of a molded product may happen.

A light stabilizer which may be used in the present invention is preferred to be one or more kind(s) of light stabilizer(s) of a hindered amine type (HALS).

Preferably, HALS is a compound which is derived from a substituted piperidine compound or, particularly, a compound which is derived from an alkyl-substituted piperidyl, piperidinyl or piperazinone compound and a substituted alkoxypiperidinyl compound. As to such compounds, known compounds may be used.

In the present invention, a mixture of secondary arylamine with HAL may be used. Preferred embodiment thereof contains at least two kinds of auxiliary stabilizers in which at least one is selected from secondary aryl amine and at least another is selected from a group of HALS. When the mixture of auxiliary stabilizers is compounded, its whole compounding amount to 100 parts by mass of polyamide resin is preferred to be 0.5 to 10 part(s) by mass, and more preferred to be 0.5 to 3 part(s) by mass. When the whole compounding amount is less than 0.5 part by mass, an effect of enhancing thermal aging resistance is insufficient. On the other hand, when the whole compounding amount is more than 10 parts by mass, the effect may reach a saturation or blooming onto the surface of a molded product may happen.

In the present invention, it is also possible that strength, rigidity, heat resistance, etc. can be significantly enhanced by addition of a filler. As to the filler as such, there may be exemplified glass fiber, carbon fiber, metal fiber, aramid fiber, asbestos, potassium titanate whisker, wollastonite, glass flakes, glass beads, talc, mica, clay, calcium carbonate, barium sulfate, titanium oxide and aluminum oxide. Among them, glass fiber of a chopped strand type is used preferably.

In compounding the above, its compounding amount to 100 parts by mass of the polyamide resin is preferred to be 5 to 140 parts by mass, and more preferred to be 5 to 100 parts by mass.

Within such an extent that the object of the present invention is not deteriorated, it is possible to add up to about 5 parts by mass of one or more kind(s) of common additive(s) such as ultraviolet absorber (e.g., resorcinol, salicylate, benzotriazole and benzophenone), lubricant, mold-releasing agent, nucleating agent, plasticizer, antistatic agent and coloring agent (e.g., dyes and pigments) to 100 parts by mass of the polyamide resin.

The polyamide resin composition of the present invention may contain each of the above-mentioned ingredients. In the composition excluding the above filler, the total amount of the polyamide resin and the metal cyanide salt is preferred to be 90% by mass or more, and more preferred to be 95% by mass or more.

In the present invention, there is no particular limitation for a method for adding the above-mentioned metal cyanide salt and other additive to the polyamide resin but any method may be adopted therefor. Examples thereof are a method wherein all ingredients are preliminarily mixed and then kneaded in an extruder or a kneader and a method wherein any several ingredients are kneaded in an extruder or a kneader and the resulting pellets are further kneaded and compounded with other ingredients.

The polyamide resin composition of the present invention can be made into a molded product by, for example, injection molding, extrusion molding, thermal molding, compression molding, or the so-called hollow process represented by blow molding, die slide molding, etc. It is also possible that the molded product as such is made into a molded product by subjecting to a secondary processing such as a welding process including, for example, oscillation welding, hot plate welding or ultrasonic wave welding. Preferred ones are injection molding or blow molding product and a molded product prepared by the secondary processing thereof.

Examples of the use of the molded product of the polyamide resin composition of the present invention in the fields of automobiles and vehicles are cylinder head cover, engine cover, housing for intercooler, valve, end cap, caster, trolley parts, etc.; inspiratory parts such as inspiratory pipe (air duct) or, particularly, inspiratory manifold; connector, wheel, fan wheel, storing container for cooling material and housing or housing member for heat exchanger; radiator, thermostat, coolant, water-supplying pump, heater, fastening element, oil saucer and housing for exhausting system such as muffler and catalyst converter; and timing chain belt front cover, gear box, bearing, gasoline cap, seat parts, headrest, door handle, wiper parts, etc.

In the electric/electronic instrument field, examples are circuit substrate parts, housing, film, conductor, switch, terminal strip, relay, resister, condenser, coil, lamp, diode, LED, transistor, connector, controller, memory, bolt, coil bobbin, plug, plug parts, mechatronics parts, parts for household electric appliances (such as cooking instruments, washer, refrigerator and air conditioner) and sensor.

In the fields relating to daily life and to furniture/building materials, there are exemplified wheel chair and baby car parts as well as parts for legs of a chair, armrest, handrail, window frame and door knob.

EXAMPLES

As hereunder, the present invention will be more specifically illustrated by referring to Examples although the present invention is not limited to those Examples. Measured values mentioned in Examples were measured by the following methods.

(1) Raw Materials Used

Polyamide 66: relative viscosity RV=2.7; Stabamid 27 AE 1K manufactured by Rhodia Polyamide 6T/12: relative viscosity RV=2.5; Test product of Toyobo (6T/12=65/35 (in molar ratio))

Potassium ferrocyanide trihydrate (potassium hexacyanoferrate (II) trihydrate), manufactured by Wako Pure Chemical Industries, 99% purity Potassium ferricyanide (potassium hexacyanoferrate (III)), manufactured by Wako Pure Chemical Industries, 99% purity Sodium ferrocyanide decahydrate (sodium hexacyanoferrate (II) decahydrate), manufactured by Wako Pure Chemical Industries, 99% purity Iron (III) chloride anhydride, manufactured by Wako Pure Chemical Industries, 99% purity Iron (II) phthalocyanine, manufactured by Wako Pure Chemical Industries, 98.0% purity Iron (II) oxide, manufactured by Wako Pure Chemical Industries Iron (III) oxide, manufactured by Wako Pure Chemical Industries Antioxidant of a phenol type: Irganox 245 manufactured by BASF Cupric bromide, manufactured by Wako Pure Chemical Industries, 99.9% purity Copper chloride, manufactured by Wako Pure Chemical Industries, 99.9% purity Glass fiber: T-275H manufactured by Nippon Electric Glass)

(2) Test Methods

Tensile strength, and tensile elongation at break: A molded product was prepared using IS-100 of Toshiba Machine wherein cylinder temperature was set at 280° C. (set at 320° C. when polyamide 6T/12 was used) and wherein metal die temperature was set at 90° C. The resulting molded product was used for the measurement in accordance with ISO 527-1,2.

Thermal aging test: A test piece was subjected to a thermal treatment in an air oven of a recycling type (NH-401 S, a hot-air cyclic dryer manufactured by Nagano Kagaku Kikai Seisakusho) in accordance with the procedure mentioned in detail in ISO 2578. The test piece was taken out from the oven after predetermined testing hours (500 and 1000 hours) under the environment of 200° C., cooled down to room temperature and tightly closed in a bag backed with aluminum until preparation for the test was finished. After that, tensile strength, and tensile elongation at break were measured in accordance with ISO 527-1,2. Mean value obtained from three test pieces was adopted.

Each of a retention rate of tensile strength, and a retention rate of tensile elongation at break is a retention rate after subjecting to a thermal treatment of 500 hours or 1000 hours when the initial value without thermal treatment was assumed to be 100%.

As to the resin composition mentioned as Examples and Comparative Examples, each of the above-mentioned raw materials was compounded in the ratio (ratio by mass) mentioned in Tables 1 and 2 using a biaxial extruder (STS 35 manufactured by Coperion) and subjected to melting and kneading to give pellets (about 2.5 mm diameter and about 2.5 mm length). The resulting pellets were used after drying at 100° C. for 4 hours or more using a hot-air cyclic dryer. Results of the evaluation are shown in Tables 1 and 2.

In Tables 1 and 2, compounding amount of each raw material is expressed in such a manner that total amount of polyamide resin, metal cyanide salt and filler (glass fiber) is taken as 100 parts by mass. When the value as such was converted, in Example 1 for example, metal cyanide salt was 7.7 parts by mass, filler was 46.2 parts by mass, antioxidant was 0.31 part by mass and copper compound was 0.03 part by mass to 100 parts by mass of the polyamide resin. When the compounding amount of only metal cyanide salt is calculated, it is 7.7 parts by mass for Examples 1 and 4; 4.5 parts by mass for Examples 2 and 8 to 12; 1.4 parts by mass for Example 3; 12 parts by mass for Example 5; 1.6 parts by mass for Example 6; 7.5 parts by mass for Example 7; 0.3 part by mass for Comparative Example 1; and 27.3 parts by mass for Comparative Example 2, to 100 parts by mass of the polyamide resin, respectively.

TABLE 1

|  |  | Examples |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| resin composition | PA66 | 65 | 67 | 69 | 65 | 62.5 |  | 46.5 | 67 | 67 | 67 | 67 | 67 |
|  | PA6T/12 |  |  |  |  |  | 64 |  |  |  |  |  |  |
|  | potassium hexacyanoferrate (II) trihydrate | 5 | 3 |  |  |  | 1 | 3.5 | 3 | 3 | 3 | 3 |  |
|  | potassium hexacyanoferrate (III) |  |  | 1 | 5 | 7.5 |  |  |  |  |  |  |  |
|  | sodium hexacyanoferrate (II) decahydrate |  |  |  |  |  |  |  |  |  |  |  | 3 |
|  | iron (III) chloride |  |  |  |  |  |  |  |  |  |  |  |  |
|  | iron (II) phthalocyanine |  |  |  |  |  |  |  |  |  |  |  |  |
|  | iron (II) oxide |  |  |  |  |  |  |  |  |  |  |  |  |
|  | iron (III) oxide |  |  |  |  |  |  |  |  |  |  |  |  |
|  | antioxidant of a phenol type | 0.2 | 0.2 | 0.2 | 0.2 | 0.2 | 0.2 | 0.2 | 0.2 |  | 0.2 | 0.2 | 0.2 |
|  | cupric bromide | 0.02 | 0.02 | 0.02 | 0.02 | 0.02 | 0.02 | 0.02 |  | 0.02 | 0.2 |  | 0.02 |
|  | copper chloride |  |  |  |  |  |  |  |  |  |  | 0.02 |  |
|  | glass fiber | 30 | 30 | 30 | 30 | 30 | 35 | 50 | 30 | 30 | 30 | 30 | 30 |
| composition characteristics | Initial (without thermal treatment) |  |  |  |  |  |  |  |  |  |  |  |  |
|  | tensile strength (MPa) | 190 | 188 | 188 | 192 | 180 | 214 | 246 | 190 | 192 | 191 | 194 | 188 |
|  | tensile elongation at break (%) | 2.5 | 2.4 | 2.4 | 2.6 | 2.4 | 2.2 | 2.0 | 2.3 | 2.5 | 2.5 | 2.5 | 2.5 |
|  | after thermal treatment at 200° C. × 500 hours |  |  |  |  |  |  |  |  |  |  |  |  |
|  | tensile strength (MPa) | 198 | 188 | 150 | 198 | 185 | 191 | 260 | 193 | 193 | 190 | 190 | 190 |
|  | tensile elongation at break (%) | 2.6 | 2.4 | 1.7 | 2.7 | 2.5 | 1.8 | 2.1 | 2.3 | 2.4 | 2.3 | 2.4 | 2.3 |
|  | retention rate of tensile strength (%) | 104 | 100 | 80 | 103 | 103 | 87 | 106 | 102 | 101 | 99 | 98 | 101 |
|  | retention rate of tensile elongation at break (%) | 104 | 100 | 71 | 104 | 104 | 81 | 95 | 100 | 96 | 92 | 96 | 92 |
|  | after thermal treatment at 200° C. × 1000 hours |  |  |  |  |  |  |  |  |  |  |  |  |
|  | tensile strength (MPa) | 170 | 158 | 100 | 158 | 175 | 182 | 238 | 143 | 180 | 170 | 170 | 172 |
|  | tensile elongation at break (%) | 1.8 | 1.6 | 1.4 | 1.7 | 2.0 | 1.7 | 1.8 | 1.8 | 1.8 | 1.8 | 1.7 | 1.8 |
|  | retention rate of tensile strength (%) | 89 | 84 | 53 | 82 | 97 | 88 | 97 | 75 | 94 | 89 | 88 | 91 |
|  | retention rate of tensile elongation at break (%) | 72 | 66 | 58 | 65 | 83 | 77 | 90 | 78 | 75 | 78 | 71 | 78 |

TABLE 2

|  |  | Comparative Examples |  |  |  |  |  |  |  |  |
|---|---|---|---|---|---|---|---|---|---|---|
|  |  | 1 | 2 | 3 | 4 | 5 | 6 | 7 | 8 | 9 |
| resin composition | PA66 | 69.8 | 55 | 68.5 | 68.5 | 67 | 69 | 70 |  | 70 |
|  | PA6T/12 |  |  |  |  |  |  |  | 65 |  |
|  | potassium hexacyanoferrate (II) trihydrate |  |  |  |  |  |  |  |  |  |
|  | potassium hexacyanoferrate (III) | 0.2 | 15 |  |  |  |  |  |  |  |
|  | sodium hexacyanoferrate (II) decahydrate |  |  |  |  |  |  |  |  |  |
|  | iron (III) chloride |  |  |  |  |  | 3 |  |  |  |
|  | iron (II) phthalocyanine |  |  |  |  |  |  | 1 |  |  |
|  | iron (II) oxide |  |  |  | 1.5 |  |  |  |  |  |
|  | iron (III) oxide |  |  |  |  | 1.5 |  |  |  |  |
|  | antioxidant of a phenol type | 0.2 | 0.2 | 0.2 | 0.2 | 0.2 | 0.2 | 0.2 | 0.2 | 0.2 |
|  | cupric bromide | 0.02 | 0.02 | 0.02 | 0.02 | 0.02 | 0.02 | 0.02 | 0.02 |  |
|  | copper chloride |  |  |  |  |  |  |  |  |  |
|  | glass fiber | 30 | 30 | 30 | 30 | 30 | 30 | 30 | 35 | 30 |

TABLE 2-continued

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| composition | Initial (without thermal treatment) | | | | | | | | | |
| characteristics | tensile strength (MPa) | 188 | 160 | 170 | 170 | 170 | 185 | 195 | 219 | 180 |
|  | tensile elongation at break (%) | 2.5 | 2.1 | 2.2 | 2.2 | 2.2 | 2.4 | 3.0 | 2.2 | 2.2 |
|  | after thermal treatment at 200° C. × 500 hours | | | | | | | | | |
|  | tensile strength (MPa) | 108 | 168 | 155 | 86 | 114 | 124 | 110 | 145 | 91 |
|  | tensile elongation at break (%) | 1.1 | 2.1 | 1.8 | 0.9 | 1.1 | 1.4 | 1.2 | 1.3 | 1.0 |
|  | retention rate of tensile strength (%) | 57 | 105 | 91 | 51 | 67 | 67 | 56 | 66 | 51 |
|  | retention rate of tensile elongation at break (%) | 44 | 100 | 82 | 41 | 50 | 58 | 40 | 59 | 45 |
|  | after thermal treatment at 200° C. × 1000 hours | | | | | | | | | |
|  | tensile strength (MPa) | 70 | 155 | 85 | 52 | 64 | 82 | 70 | 118 | 35 |
|  | tensile elongation at break (%) | 0.8 | 2.0 | 1.0 | 0.6 | 0.7 | 1.0 | 0.8 | 1.0 | 0.4 |
|  | retention rate of tensile strength (%) | 37 | 97 | 50 | 31 | 38 | 44 | 36 | 54 | 19 |
|  | retention rate of tensile elongation at break (%) | 32 | 95 | 46 | 27 | 32 | 41 | 27 | 45 | 19 |

In Examples 1 to 5 and 12, tensile strength, and tensile elongation at break in the initial stage (before the thermal treatment) are high, and a retention rate of tensile strength, and a retention rate of tensile elongation at break after the thermal treatment at 200° C. for 500 hours and 1000 hours are also high.

Example 6 is an example wherein polyamide 6T/12 is used. In Example 6, tensile strength, and tensile elongation at break in the initial stage (before the thermal treatment) are high, and a retention rate of tensile strength, and a retention rate of tensile elongation at break after the thermal treatment at 200° C. for 500 hours and 1000 hours are also high.

Example 7 is an example wherein the amount of glass fiber is abundant. In Example 7, tensile strength, and tensile elongation at break in the initial stage (before the thermal treatment) are high, and a retention rate of tensile strength, and a retention rate of tensile elongation at break after the thermal treatment at 200° C. for 500 hours and 1000 hours are also high.

Example 8 is an example wherein copper compound is not added. In Example 8, tensile strength, and tensile elongation at break in the initial stage (before the thermal treatment) are high, and a retention rate of tensile strength, and a retention rate of tensile elongation at break after the thermal treatment at 200° C. for 500 hours and 1000 hours are also high.

Example 9 is an example wherein antioxidant of a phenol type is not added. In Example 9, tensile strength, and tensile elongation at break in the initial stage (before the thermal treatment) are high, and a retention rate of tensile strength, and a retention rate of tensile elongation at break after the thermal treatment at 200° C. for 500 hours and 1000 hours are also high.

Example 10 is an example wherein much amount of a copper compound is added. In Example 10, tensile strength, and tensile elongation at break in the initial stage (before the thermal treatment) are high, and a retention rate of tensile strength, and a retention rate of tensile elongation at break after the thermal treatment at 200° C. for 500 hours and 1000 hours are also high.

Example 11 is an example wherein type of a copper compound is changed. In Example 11, tensile strength, and tensile elongation at break in the initial stage (before the thermal treatment) are high, and a retention rate of tensile strength, and a retention rate of tensile elongation at break after the thermal treatment at 200° C. for 500 hours and 1000 hours are also high.

Comparative Example 7 is an example wherein only antioxidant of a phenol type and cupric bromide are added. In Comparative Example 7, a retention rate of tensile strength, and a retention rate of tensile elongation at break after 500 hours and 1000 hours at 200° C. significantly lower.

Comparative Example 1 is an example wherein the adding amount of potassium hexacyanoferrate (III) is small. In Comparative Example 1, a retention rate of tensile strength, and a retention rate of tensile elongation at break after 500 hours and 1000 hours at 200° C. significantly lower.

Comparative Example 2 is an example wherein the adding amount of potassium hexacyanoferrate (III) is excessive. In Comparative Example 2, a retention rate of tensile strength, and a retention rate of tensile elongation at break after 500 hours and 1000 hours at 200° C. are not enhanced even as compared with Example 5. In addition, tensile strength, and tensile elongation at break in initial stage lower as compared with Example 5.

Comparative Example 3 is an example wherein iron (II) oxide is added. In Comparative Example 3, a retention rate of tensile strength, and a retention rate of tensile elongation at break after 500 hours and 1000 hours at 200° C. are relatively high. However, this is because tensile strength, and tensile elongation at break in the initial stage are low as compared with Examples 1 to 5 and 12. Tensile strength, and tensile elongation at break after the thermal treatment are low as compared with Examples 1 to 5 and 12.

Comparative Examples 4, 5 and 6 are examples wherein iron (III) oxide, iron (III) chloride and phthalocyanine iron (II) are added, respectively. In Comparative Examples 4, 5 and 6, a retention rate of tensile strength, and a retention rate of tensile elongation at break after 500 hours and 1000 hours at 200° C. significantly lower.

Comparative Example 8 is an example wherein polyamide 6T/12 is used and wherein only antioxidant of a phenol type and cupric bromide are added. In Comparative Example 8, a retention rate of tensile strength, and a retention rate of tensile elongation at break after 500 hours and 1000 hours at 200° C. significantly lower.

Comparative Example 9 is an example wherein polyamide 66 is used and wherein only antioxidant of a phenol type is added. In Comparative Example 9, a retention rate of tensile strength, and a retention rate of tensile elongation at break after 500 hours and 1000 hours at 200° C. significantly lower.

INDUSTRIAL APPLICABILITY

In accordance with the present invention, thermal aging resistance of a polyamide resin under high-temperature environment of about 200° C. can be easily and stably enhanced. Accordingly, the polyamide resin composition obtained by the present invention can be utilized for parts of automobiles and electric/electronic products which have a possibility of being exposed to the environment of 200° C.

The invention claimed is:

1. A polyamide resin composition comprising 0.5 to 20 part(s) by mass of a metal cyanide salt having the following general composition formula (1) with respect to 100 parts by mass of a polyamide resin:

$$A_x[M(CN)_y]$$
General composition formula (1)

wherein in the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A, wherein, when the composition comprises a copper compound, the copper compound is selected from the group consisting of copper acetate, copper iodide, copper bromide, copper chloride, copper fluoride, copper laurate, copper stearate and, and wherein the composition excludes clay.

2. The polyamide resin composition according to claim 1, wherein M in the general composition formula (1) is iron.

3. The polyamide resin composition according to claim 1, wherein the metal cyanide salt in the general composition formula (1) is one or more member(s) selected from the group consisting of alkali metal hexacyanoferrate (II) and alkali metal hexacyanoferrate (III).

4. The polyamide resin composition according to claim 1, wherein, to 100 parts by mass of the polyamide resin, a copper compound is compounded in an amount of 0.0001 to 1 part by mass as copper.

5. A method for enhancing thermal aging resistance of a polyamide resin, comprising adding to the polyamide resin 0.5 to 20 part(s) by mass of a metal cyanide salt having the following general composition formula (1) with respect to 100 parts by mass of the polyamide resin to form a polyamide resin composition:

$$A_x[M(CN)_y]$$
General composition formula (1)

wherein in the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A, wherein, when the composition comprises a copper compound, the copper compound is selected from the group consisting of copper acetate, copper iodide, copper bromide, copper chloride, copper fluoride, copper laurate, copper stearate, and wherein the composition excludes clay.

* * * * *